United States Patent
Minerbo et al.

(10) Patent No.: US 6,969,994 B2
(45) Date of Patent: Nov. 29, 2005

(54) DIRECTIONAL ELECTROMAGNETIC MEASUREMENTS INSENSITIVE TO DIP AND ANISOTROPY

(75) Inventors: Gerald N. Minerbo, Missouri City, TX (US); Dzevat Omeragic, Sugar Land, TX (US); Richard A. Rosthal, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 236 days.

(21) Appl. No.: 10/113,132

(22) Filed: Mar. 29, 2002

(65) Prior Publication Data

US 2003/0085707 A1 May 8, 2003

Related U.S. Application Data

(60) Provisional application No. 60/325,272, filed on Sep. 26, 2001, and provisional application No. 60/325,273, filed on Sep. 26, 2001.

(51) Int. Cl.[7] .......................... G01V 3/10; G01V 3/08
(52) U.S. Cl. .................. 324/343; 324/338; 324/339
(58) Field of Search ................ 324/338, 339–343; 702/7, 11

(56) References Cited

U.S. PATENT DOCUMENTS

| | | | |
|---|---|---|---|
| 4,319,191 A | 3/1982 | Meador et al. | |
| 4,968,940 A | * 11/1990 | Clark et al. | 324/338 |
| 5,115,198 A | 5/1992 | Gianzero et al. | |
| 5,438,267 A | * 8/1995 | Wu | 324/339 |
| 5,508,616 A | 4/1996 | Sato et al. | |
| 5,594,343 A | 1/1997 | Clark et al. | |
| 5,757,191 A | 5/1998 | Gianzero | |
| 5,781,436 A | 7/1998 | Forgang et al. | |
| 5,892,460 A | 4/1999 | Jerabek et al. | |
| 5,999,883 A | 12/1999 | Gupta et al. | |
| 5,999,884 A | 12/1999 | Kriegshauser et al. | |
| 6,044,325 A | 3/2000 | Chakravarthy et al. | |
| 6,147,496 A | 11/2000 | Strack et al. | |
| 6,163,155 A | * 12/2000 | Bittar | 324/338 |
| 6,181,138 B1 | 1/2001 | Hagiwara et al. | |
| 6,304,086 B1 | * 10/2001 | Minerbo et al. | 324/338 |

FOREIGN PATENT DOCUMENTS

| | | |
|---|---|---|
| GB | 2 279 149 A | 12/1994 |
| WO | WO 02/04986 A1 | 1/2002 |

* cited by examiner

*Primary Examiner*—Jay Patidar
(74) *Attorney, Agent, or Firm*—Kevin P. McEnaney; Victor H. Segura; Dale Gaudier

(57) ABSTRACT

Systems and methods are provided for directional propagation-type logging measurements not sensitive to dip and anisotropy over a wide frequency range. Estimates of the distance of the logging tool to a bed boundary are obtained using "up-down" measurements with antenna configurations having tilted magnetic dipoles. These estimates are insensitive to anistropy and dip, undesirable complications of directional measurements.

75 Claims, 7 Drawing Sheets

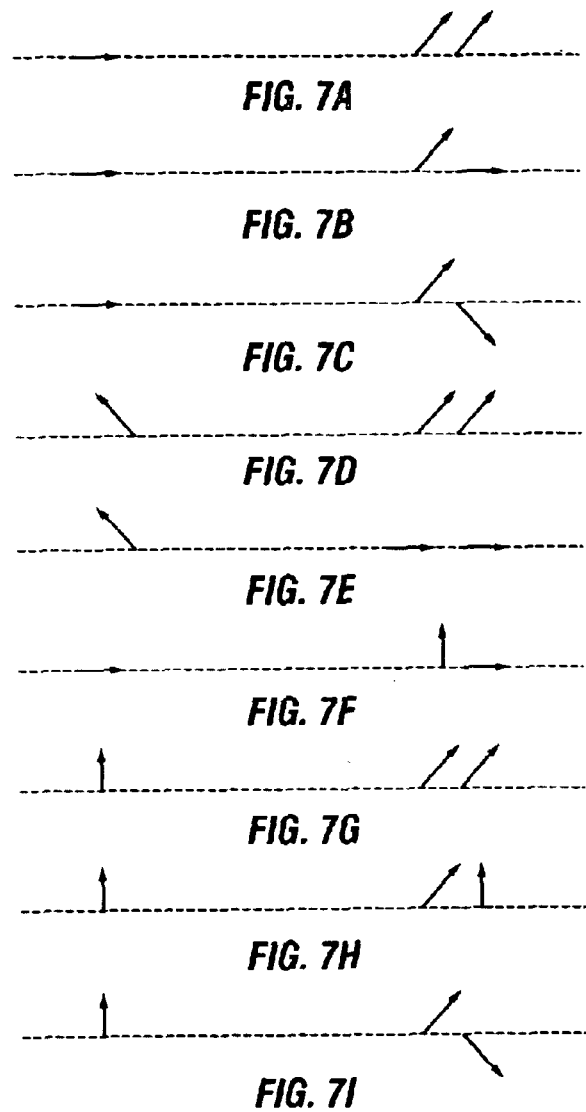
FIG. 7A
FIG. 7B
FIG. 7C
FIG. 7D
FIG. 7E
FIG. 7F
FIG. 7G
FIG. 7H
FIG. 7I
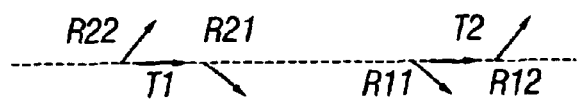
FIG. 8A
FIG. 8B

DIRECTIONAL ELECTROMAGNETIC MEASUREMENTS INSENSITIVE TO DIP AND ANISOTROPY

CROSS-REFERENCE TO RELATED APPLICATIONS

This invention claims priority from U.S. Provisional Application Ser. No. 60/325,272 filed on Sep. 26, 2001 and U.S. Provisional Application Ser. No. 60/325,273 filed on Sep. 26, 2001.

BACKGROUND OF INVENTION

1. Field of the Invention

The invention relates generally to the field of well logging. More particularly, the invention relates to improved techniques in which instruments equipped with antenna systems having transverse or tilted magnetic dipoles are used for improved electromagnetic measurements of subsurface formations.

2. Background Art

Various well logging techniques are known in the field of hydrocarbon exploration and production. These techniques typically use instruments or tools equipped with sources adapted to emit energy into a subsurface formation that has been penetrated by a borehole. In this description, "instrument" and "tool" will be used interchangeably to indicate, for example, an electromagnetic instrument (or tool), a wire-line tool (or instrument), or a logging-while-drilling tool (or instrument). The emitted energy interacts with the surrounding formation to produce signals that are then detected and measured by one or more sensors. By processing the detected signal data, a profile of the formation properties is obtained.

Electromagnetic (EM) induction and propagation logging are well-known techniques. The logging instruments are disposed within a borehole to measure the electrical conductivity (or its inverse, resistivity) of earth formations surrounding the borehole. In the present description, any reference to conductivity is intended to encompass its inverse, resistivity, or vice versa. A typical electromagnetic resistivity tool comprises a transmitter antenna and one or more (typically a pair) receiver antennas disposed at a distance from the transmitter antenna along the axis of the tool (see FIG. 1).

Induction tools measure the resistivity (or conductivity) of the formation by measuring the current induced in the receiver antenna as a result of magnetic flux induced by currents flowing through the emitting (or transmitter) antenna. An EM propagation tool operates in a similar fashion but typically at higher frequencies than do induction tools for comparable antenna spacings (about $10^6$ Hz for propagation tools as compared with about $10^4$ Hz for the induction tools). A typical propagation tool may operate at a frequency range of 1 kHz–2 MHz.

Conventional transmitters and receivers are antennas formed from coils comprised of one or more turns of insulated conductor wire wound around a support. These antennas are typically operable as sources and/or receivers. Those skilled in the art will appreciate that the same antenna may be use as a transmitter at one time and as a receiver at another. It will also be appreciated that the transmitter-receiver configurations disclosed herein are interchangeable due to the principle of reciprocity, i.e., the "transmitter" may be used as a "receiver", and vice-versa.

A coil carrying a current (e.g., a transmitter coil) generates a magnetic field. The electromagnetic energy from the transmitter antenna is transmitted into the surrounding formation, which induces a current (eddy current) flowing in the formation around the transmitter (see FIG. 2A). The eddy current in the formation in turn generates a magnetic field that induces an electrical voltage in the receiver antennas. If a pair of spaced-apart receivers are used, the induced voltages in the two receiver antennas would have different phases and amplitudes due to geometric spreading and absorption by the surrounding formation. The phase difference (phase shift, $\Phi$) and amplitude ratio (attenuation, A) from the two receivers can be used to derive resistivity of the formation. The detected phase shift ($\Phi$) and attenuation (A) depend on not only the spacing between the two receivers and the distances between the transmitter and the receivers, but also the frequency of EM waves generated by the transmitter.

In conventional induction and propagation logging instruments, the transmitter and receiver antennas are mounted with their axes along the longitudinal axis of the instrument. Thus, these tools are implemented with antennas having longitudinal magnetic dipoles (LMD). An emerging technique in the field of well logging is the use of instruments including antennas having tilted or transverse coils, i.e., where the coil's axis is not parallel to the longitudinal axis of the support or borehole. These instruments are thus implemented with a transverse or tilted magnetic dipole (TMD) antenna. Those skilled in the art will appreciate that various ways are available to tilt or skew an antenna. Logging instruments equipped with TMD antennas are described in U.S. Pat. Nos. 6,163,155, 6,147,496, 5,115,198, 4,319,191, 5,508,616, 5,757,191, 5,781,436, 6,044,325, and 6,147,496.

FIG. 2A presents a simple picture, which is applicable if the borehole penetrates the formation in a direction perpendicular to the sedimentation layers. However, this is often not the situation. Often the borehole penetrates the formation layers at an angle other than 90 degrees (FIG. 2B). When this happens, the formation plane is said to have a relative dip. A relative dip angle, $\theta$, is defined as the angle between the borehole axis (tool axis) and the normal to the plane of the formation (not shown).

Drilling techniques known in the art include drilling wellbores from a selected geographic position at the earth's surface, along a selected trajectory. The trajectory may extend to other selected geographic positions at particular depths within the wellbore. These techniques are known collectively as "directional drilling" techniques. One application of directional drilling is the drilling of highly deviated (with respect to vertical), or even horizontal, wellbores within and along relatively thin hydrocarbon-bearing earth formations (called "pay zones") over extended distances. These highly deviated wellbores are intended to greatly increase the hydrocarbon drainage from the pay zone as compared to "conventional" wellbores which "vertically" (substantially perpendicularly to the layering of the formation) penetrate the pay zone.

In highly deviated or horizontal wellbore drilling within a pay zone, it is important to maintain the trajectory of the wellbore so that it remains within a particular position in the pay zone. Directional drilling systems are well known in the art which use "mud motors" and "bent subs" as means for controlling the trajectory of a wellbore with respect to geographic references, such as magnetic north and earth's gravity (vertical). Layering of the formations, however, may be such that the pay zone does not lie along a predictable trajectory at geographic positions distant from the surface location of the wellbore. Typically the wellbore operator uses information (such as LWD logs) obtained during wellbore drilling to maintain the trajectory of the wellbore within the pay zone, and to further verify that the wellbore is, in fact, being drilled within the pay zone.

Techniques known in the art for maintaining trajectory are described for example in ribe et al., *Precise Well Placement using Rotary Steerable Systems and LWD Measurement*, SOCIETY OF PETROLEUM ENGINEERS, Paper 71396, Sep. 30, 2001. The technique described in this reference is based upon LWD conductivity sensor responses. If, as an example, the conductivity of the pay zone is known prior to penetration by the wellbore, and if the conductivities of overlying and underlying zones provide a significant contrast with respect to the pay zone, a measure of formation conductivity made while drilling can be used as a criterion for "steering" the wellbore to remain within the pay zone. More specifically, if the measured conductivity deviates significantly from the conductivity of the pay zone, this is an indication that the wellbore is approaching, or has even penetrated, the interface of the overlying or underlying earth formation. As an example, the conductivity of an oil-saturated sand may be significantly lower than that of a typical overlying and underlying shale. An indication that the conductivity adjacent the wellbore is increasing can be interpreted to mean that the wellbore is approaching the overlying or the underlying formation layer (shale in this example). The technique of directional drilling using a formation property measurement as a guide to trajectory adjustment is generally referred to as "geosteering."

In addition to EM measurements, acoustic and radioactive measurements are also used as means for geosteering. Again using the example of an oil producing zone with overlying and underlying shale, natural gamma radioactivity in the pay zone is generally considerably less than the natural gamma ray activity of the shale formations above and below the pay zone. As a result, an increase in the measured natural gamma ray activity from a LWD gamma ray sensor will indicate that the wellbore is deviating from the center of the pay zone and is approaching or even penetrating either the upper or lower shale interface.

If, as in the prior examples, the conductivity and natural radioactivity of the overlying and underlying shale formations are similar to each other, the previously described geosteering techniques indicate only that the wellbore is leaving the pay zone, but do not indicate whether the wellbore is diverting out of the pay zone through the top of the zone or through the bottom of the zone. This presents a problem to the wellbore operator, who must correct the wellbore trajectory to maintain the selected position in the pay zone.

EM induction logging instruments are well suited for geosteering applications because their lateral (radial) depth of investigation into the formations surrounding the wellbore is relatively large, especially when compared to nuclear instruments. The deeper radial investigation enables induction instruments to "see" a significant lateral (or radial) distance from axis of the wellbore. In geosteering applications, this larger depth of investigation would make possible detection of approaching formation layer boundaries at greater lateral distances from the wellbore, which would provide the wellbore operator additional time to make any necessary trajectory corrections. However, conventional propagation-type instruments are capable of resolving axial and lateral (radial) variations in conductivity of the formations surrounding the instrument, but the response of these instruments generally cannot resolve azimuthal variations in the conductivity of the formations surrounding the instrument.

U.S. Pat. Nos. 6,181,138 and 5,892,460 describe the use of TMD antennas to provide directional sensitivity related to bed boundaries. U.S. Pat. No. 5,892,460 proposes using propagation measurements and off-centered antennas from the tool axis for directional measurements. U.S. Pat. Nos. 5,781,436, 5,999,883, and 6,044,325 describe methods for producing estimates of various formation parameters from tri-axial measurements. Disadvantages of these techniques include the coupled effects of dip and formation anisotropy on the resulting measurements.

It is desirable to have measurement techniques that eliminate adverse characteristics of measurements with TMD antennas in geosteering, well placement, directional drilling, or horizontal well drilling applications. It is also desirable to have systems and processes that are insensitive to dip and anisotropy for the estimation of bed boundary parameters.

SUMMARY OF INVENTION

The invention provides various methods for determining a property of a subsurface formation traversed by a borehole. The methods comprise disposing a logging instrument having a longitudinal axis and equipped with multiple antennas within the borehole, a first transmitter antenna having its magnetic moment oriented in a first direction with respect to the instrument axis, a first receiver antenna having its magnetic moment oriented in said first direction with respect to the instrument axis, a second transmitter antenna having its magnetic moment oriented in a second direction with respect to the instrument axis, a second receiver antenna having its magnetic moment oriented in said second direction with respect to the instrument axis; activating the first transmitter antenna to transmit electromagnetic energy; measuring a signal associated with the transmitted energy at the second receiver antenna; deactivating the first transmitter antenna; activating the second transmitter antenna to transmit electromagnetic energy; measuring a signal associated with the transmitted energy at the first receiver antenna; and calculating the difference between the measured signals to determine the formation property.

Other aspects and advantages of the invention will be apparent from the following description and the appended claims.

BRIEF DESCRIPTION OF DRAWINGS

FIGS. 7A–7I are schematic diagrams of variations of antenna configurations according to the invention.

FIGS. 8A and 8B are schematic diagrams of antenna configurations according to the invention.

DETAILED DESCRIPTION

Figure 1:
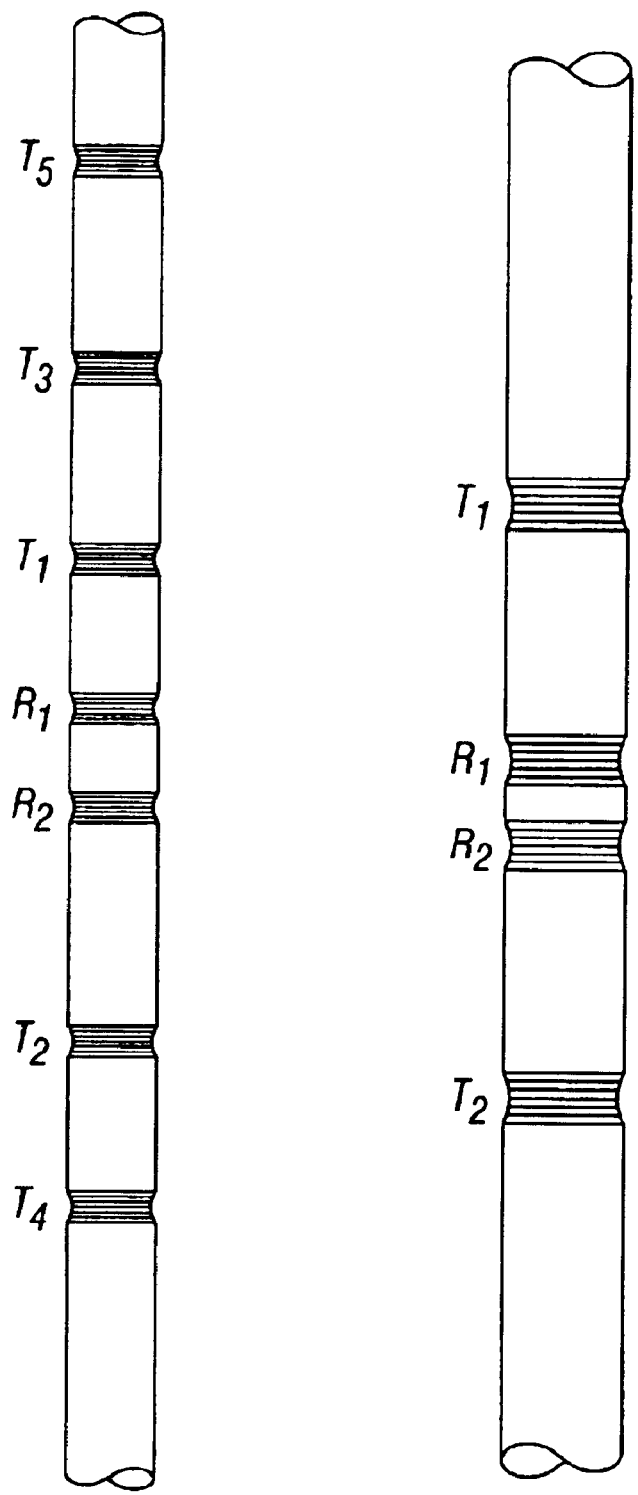
FIG. 1 is a schematic diagram of prior art induction or propagation tools.
Figure 2A:
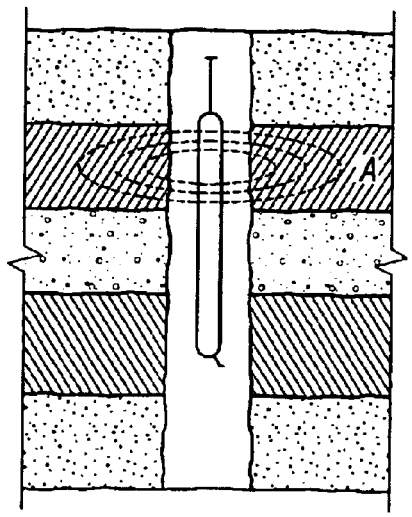
FIGS. 2A and 2B are diagrams showing eddy currents induced by a logging tool in a formation with and without a dip, respectively..
Figure 2B:
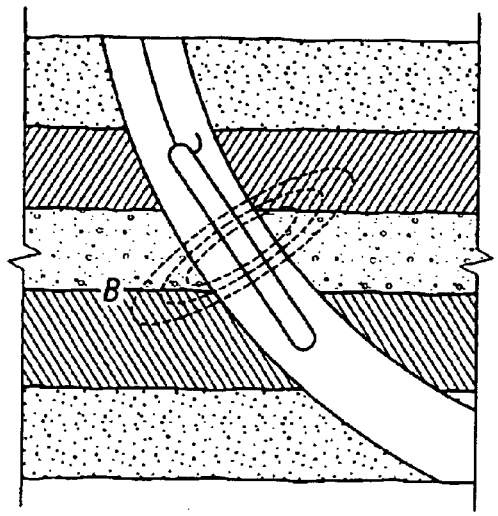
Figure 3:
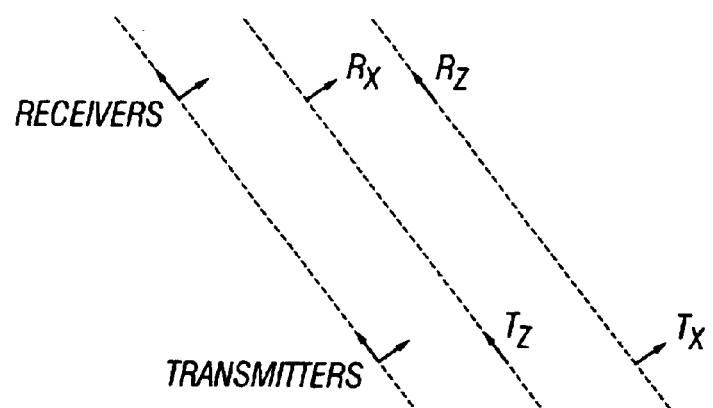
FIG. 3 is a schematic diagram of a symmetrized cross-dipole directional induction measurement according to the invention.

FIG. 3 illustrates a measurement technique according to the invention. The transmitters and receivers are approximated as point magnetic dipoles. The antennas labeled Z have a dipole moment along the tool axis; the antennas labeled X have a dipole moment perpendicular to the tool axis. The instrument does not move during this idealized measurement, but is displaced sideways in the FIG. 3 for clarity. In the interest of clarity, the instrument axis is generally represented as a dashed line. The Z transmitter is activated, and the voltage measured on the X receiver is denoted $V_{ZX}$. The X transmitter is then activated, and the voltage measured on the Z receiver is denoted $V_{XZ}$. The cross-dipole measurement based on the difference $V_{ZX}-V_{XZ}$ is used to obtain information about adjacent bed boundaries. The mathematical theory underlying the invention is now presented.

Basic properties of the cross-dipole measurement. For a transmitter carrying a current I, the voltage V measured at the receiver can be expressed in terms of a tensor transfer impedance $\vec{Z}_{RT}$:

$$V = I u_R \cdot \vec{Z}_{RT} \cdot u_T. \tag{1}$$

The transmitter antenna has a magnetic dipole moment oriented along the unit vector $u_T$; the receiver antenna is oriented along $u_R$. The transfer impedance $\vec{Z}_{RT}$ has the following symmetry property $$\vec{Z}_{RT} = \vec{Z}_{TR}^T, \tag{2}$$

where the superscript $^T$ denotes the transpose tensor.

Two sets of orthogonal unit vectors are introduced, $u_x$, $u_y$, $u_z$, for the formation, and $u_X$, $u_Y$, $u_Z$, for the tool coordinates, with $u_Z$ along the axis of symmetry of the tool. The z axis is perpendicular to the layers, oriented upward. The tool axis is in the x-z plane. The dip angle is denoted by $\alpha$, so that $$u_X = u_x \cos \alpha + u_z \sin \alpha,$$

$$u_Y = u_y,$$

$$u_Z = -u_x \sin \alpha + u_z \cos \alpha. \tag{3}$$

The symmetrized cross-dipole measurement in the tool coordinates can be transformed to formation coordinates as follows:

$$V_{ZX} - V_{XZ} = I u_Z \cdot \vec{Z}_{RT} \cdot u_X - I u_X \cdot \vec{Z}_{RT} \cdot u_Z \tag{4}$$

$$= I(-u_x \sin\alpha + u_z \cos\alpha) \cdot \vec{Z}_{RT} \cdot (u_x \cos\alpha + u_z \sin\alpha) -$$

$$I(u_x \cos\alpha + u_z \sin\alpha) \cdot \vec{Z}_{RT} \cdot (-u_x \sin\alpha + u_z \cos\alpha)$$

$$= I(\cos^2\alpha + \sin^2\alpha)(u_z \cdot \vec{Z}_{RT} \cdot u_x - u_x \cdot \vec{Z}_{RT} \cdot u_z) \tag{5}$$

$$= I(u_z \cdot \vec{Z}_{RT} \cdot u_x - u_x \cdot \vec{Z}_{RT} \cdot u_z) \tag{6}$$

$$= V_{zx} - V_{xz}.$$

We get the same result in the tool coordinates as in the formation coordinates.

The voltage difference $V_{zx}-V_{xz}$ in the formation coordinates can be computed from:

$$V_{zx} - V_{xz} = I(u_z \cdot \vec{Z}_{RT} \cdot u_x - u_x \cdot \vec{Z}_{RT} \cdot u_z) \tag{7}$$

$$= \frac{ikZ_0 A_R A_T I}{4\pi}$$

$$\int_C q H_1^{(1)}(q\rho) \left( \frac{\partial}{\partial z_R} + \frac{\partial}{\partial z_T} \right) \gamma^h(z_R, z_T) q \, dq.$$

Here $A_R$ and $A_T$ represent the area of receiver and transmitter respectively. Here $Z_0 = \sqrt{\mu_0/\epsilon_0} = 376.7$ ohms is the impedance of free space, k is the free-space propagation coefficient, and $H_1^{(1)}$ is a Hankel function of the first kind of order one. The distance between the receiver and transmitter antennas, projected horizontally, is $$\rho = \sqrt{(x_R - x_T)^2 + (y_R + y_T)^2}. \tag{8}$$

The path of integration C must lie above the origin and below the singularities of $\gamma^h$.

The transfer impedance $\vec{Z}_{RT}$ is expressed in terms of two scalar Green's functions $\gamma^e$ and $\gamma^h$. These scalar Green's functions are solutions of the following ordinary differential equations (ODEs):

$$\frac{d}{dz} \frac{1}{\epsilon_\perp} \frac{d}{dz} \gamma^e(z, z') + \left( k^2 \mu_\perp - \frac{q^2}{\epsilon_z} \right) \gamma^e(z, z') = \delta(z - z'), \tag{9}$$

$$\frac{d}{dz} \frac{1}{\mu_\perp} \frac{d}{dz} \gamma^h(z, z') + \left( k^2 \epsilon_\perp - \frac{q^2}{\mu_z} \right) \gamma^h(z, z') = \delta(z - z'). \tag{10}$$

The $\epsilon$ and $\mu$ in these equations denote the relative permitivity and permeability $$\mu_\perp = \frac{\mu_h}{\mu_0}, \quad \mu_z = \frac{\mu_v}{\mu_0}, \tag{11}$$

$$\epsilon_\perp = \left( \frac{\epsilon_h}{\epsilon_0} + \frac{i\sigma_h}{\omega\epsilon_0} \right), \quad \epsilon_z = \left( \frac{\epsilon_v}{\epsilon_0} + \frac{i\sigma_v}{\omega\epsilon_0} \right).$$

The subscripts $_h$ and $_v$ indicate horizontal and vertical components. Variability of the magnetic permeability $\mu$ is not interesting for this application; we will assume that the magnetic permeability is isotropic, $\mu_z = \mu_\perp$, and constant. Because $\gamma^h$ is independent of $\epsilon_z$, and $V_{zx}-V_{xz}$ couples only to $\gamma^h$, it follows that $V_{zx}-V_{xz}$ is independent of the vertical components of conductivity $\sigma_z$ and permitivity $\epsilon_z$.

The Green's function $\gamma^h$ can be constructed from solutions of a homogeneous one-dimensional ODE:

$$\frac{d}{dz}\frac{1}{\mu_\perp}\frac{d}{dz}\psi^h + \left(k^2\epsilon_\perp - \frac{q^2}{\mu_z}\right)\psi^h = 0. \tag{12}$$

Let $\psi^{h-}$ a solution that is regular at $z=-\infty$ and $\psi^{h+}$ a solution that is regular at $z=+\infty$. From these solutions, one can construct Green's functions by Lagrange's method. The Green's function $\gamma^h$ can be expressed as $$\gamma^h(z,z') = \frac{\psi^{h-}(z_<)\psi^{h+}(z_>)}{W^h}, \tag{13}$$

where $z_<=\min(z,z')$, and $z_>=\max(z,z')$. The Wronskian $W^h$, defined by $$W^h = \frac{1}{\mu_\perp}\left[\psi^{h-}(z)\frac{d}{dz}\psi^{h+}(z) - \psi^{h+}(z)\frac{d}{dz}\psi^{h-}(z)\right], \tag{14}$$

is independent of z. Equation (10) shows that the Green's functions $\gamma^h$ is symmetric $$\gamma^h(z_R,z_T)=\gamma^h(z_T,z_R). \tag{15}$$

Born Approximation. An approximate method of solving Equation (10) can be obtained by first constructing $\gamma^h$ for a uniform background medium (subscript $_B$):

$$\gamma_B^h(z_R,z_T) = \frac{\mu_\perp}{2\beta_B^h}\exp(-\beta_B^h|z_R-z_T|), \text{ where} \tag{16}$$

$$\beta_B^h = \sqrt{q^2 - (\epsilon_\perp\mu_\perp)_B k^2}, \text{real}(\beta_B^h) \geq 0. \tag{17}$$

Equation (10) is replaced by $$\frac{d^2}{dz^2}[\gamma^h(z,z')-\gamma_B^h(z,z')] + (k^2\epsilon_\perp\mu_\perp - q^2)[\gamma^h(z,z')-\gamma_B^h(z,z')] = \tag{18}$$

$$-[k^2\epsilon_\perp\mu_\perp - (k^2\epsilon_\perp\mu_\perp)_B]\gamma_B^h(z,z'),$$

which can be solved iteratively. The first iteration is called the Born approximation $$\gamma_{Born}^h(z,z')=\gamma_B^h(z,z')-k^2\int\gamma_B^h(z,z'')[\epsilon_\perp(z'')-(\epsilon_\perp)_B]\gamma_B^h(z'',z')dz''. \tag{19}$$

The Born approximation is accurate for low frequency, low conductivity, or low conductivity contrast. This iterative solution method cannot be applied to $\gamma^e$ because Equation (9) does not have the required smoothness properties. The Born approximation is not valid for $\gamma^e$, nor for general tri-axial measurements.

By substituting Equation (19) in Equation (7), we obtain $$V_{zx}-V_{xz} \approx \frac{ikZ_0 A_R A_T I}{4\pi}k^2\mu_\perp^2 \tag{20}$$

$$\int K_{Born}(\rho, 2z_F - z_R - z_T)\epsilon_\perp(z_F)dz_F.$$

The homogeneous medium terms cancel out. For the case where $z_T<z_R$, the Born kernel $K_{Born}$ is given by $$K_{Born} = \frac{\partial}{\partial\rho}\frac{\exp(ik(\epsilon_\perp\mu_\perp)^{1/2}S)}{S}, \text{ for } z_R < z_F, \tag{21}$$

$$0, \text{ for } z_T < z_F < z_R,$$

$$-\frac{\partial}{\partial\rho}\frac{\exp(ik(\epsilon_\perp\mu_\perp)^{1/2}S)}{S}, \text{ for } z_F < z_T,$$

with $$S = [\rho^2 + (2z_F - z_R - z_T)^2]^{1/2}. \tag{22}$$

To simplify the contour integral, we used $$\frac{\exp(ik(\epsilon_\perp\mu_\perp)^{1/2}(\rho^2+z^2)^{1/2})}{(\rho^2+z^2)^{1/2}} = \int_C H_0^{(1)}(q\rho)e^{-\beta|z|}\frac{q}{2\beta}dq. \tag{23}$$

Response in a uniform layer. In a uniform layer, $V_{zx}-V_{xz}$ can be evaluated analytically. Suppose that the electrical parameters $\epsilon_\perp$, $\mu_\perp$ are independent of z in an interval $z_L<z_T<z_R<z_H$. The solutions $\psi^-$, $\psi^+$, from Equation (12), have the form $$\psi^- = A^-(e^{\beta z} + R^- e^{-\beta(z-2z_L)}), \tag{24}$$

$$\psi^+ = A^+(e^{-\beta z} + R^+ e^{\beta(z-2z_H)}), \tag{25}$$

with $\beta = \beta^h$, where $$\beta^h = \sqrt{\frac{\mu_\perp}{\mu_z}q^2 - \epsilon_\perp\mu_\perp k^2}, \tag{26}$$

choosing the branch of the square root that makes real $(\beta)\geq 0$. Equation (13) gives $$\left(\frac{\partial}{\partial z_R} + \frac{\partial}{\partial z_T}\right)\gamma^h(z_R,z_T) = \mu_\perp\frac{R^- e^{-\beta(z_R+z_T-2z_L)} - R^+ e^{-\beta(2z_H-z_R-z_T)}}{1 - R^- R^+ e^{-2\beta(z_H-z_L)}}. \tag{27}$$

This expression depends only on the sum of the vertical positions of the receiver and transmitter coils $z_R+z_T$. Generally, the magnitude of reflection coefficients is smaller than unity. The exponential factor in the denominator provides further attenuation since real $(\beta)\geq 0$. Thus one can expect that, in a thick layer, $$|R^- R^+ e^{-2\beta(z_H-z_L)}|<<1. \tag{28}$$

The expression in Equation (27) is then the sum of two contributions proportional to the reflection coefficients from the lower and upper boundaries. This gives a simple formula for interpreting the measurement in a thick uniform layer:

$$V_{zx}-V_{xz} \approx \frac{ikZ_0\mu_\perp A_R A_T I}{4\pi}\int_C qH_1^{(1)}(q\rho) \tag{29}$$

$$[R^- e^{-\beta(z_R+z_T-2z_L)} - R^+ e^{-\beta(2z_H-z_R-z_T)}]qdq.$$

The measurement depends weakly on the antenna separation and dip angle through the distance $\rho$.

Response at large distance from boundary. As seen in Equation (29), the effect of the upper and lower boundaries can be studied separately. Here we study the effect of the lower boundary. We assume that $R^+=0$ or $z_H \to \infty$, $$V_{zx} - V_{xz} \approx \frac{ikZ_0\mu_\perp A_R A_T I}{4\pi} \int_C H_1^{(1)}(q\rho) R^- e^{-\beta(z_R+z_T-2z_L)} q^2 dq. \quad (30)$$

A simple approximation can be obtained if $$k^2|\epsilon_\perp \mu_\perp|(\rho^2+(z_R+z_T-2z_L)^2) \gg 1. \quad (31)$$

The Hankel function is replaced by its asymptotic expansion:

$$H_1^{(1)}(u) \sim \sqrt{\frac{2}{\pi u}} \exp\left(iu - \frac{3}{4}\pi\right), |u| \to \infty. \quad (32)$$

The stationary phase method is applied to the integral in Equation (30). The main contribution to the integral comes from the point $q_s$ where $$\frac{d}{dq}\Phi(q) = 0,$$

using the phase function $$\phi(q) = iq\rho - \beta^h(q)(z_R+z_T-2z_L). \quad (33)$$

The position of the saddle point is $$q_s = k\sqrt{\epsilon_\perp \mu_\perp} \rho[\rho^2+(z_R+z_T-2z_L)^2]^{-1/2}. \quad (34)$$

The reflection coefficient, evaluated at $q_s$, is pulled out of the integration $$V_{zx} - V_{xz} \approx \frac{ikZ_0\mu_\perp A_R A_T I}{4\pi} R^-(q_s) \quad (35)$$

$$\int_C H_1^{(1)}(q\rho) e^{-\beta(z_R+z_T-2z_L)} q^2 dq.$$

The integral is proportional to the field produced by an image transmitter at $$z_I = 2z_L - z_T. \quad (36)$$

Again we use the integral representation $$\frac{\exp(ik(\epsilon_\perp \mu_\perp)^{1/2}D)}{D} = \int_C H_0^{(1)}(q\rho) e^{-\beta(z_R-z_I)} \frac{q}{2\beta} dq, \quad (37)$$

with $$D = [\rho^2+(z_R-z_I)^2]^{1/2}, \quad (38)$$

to get the approximate formula $$V_{zx} - V_{xx} \approx \frac{ikZ_0\mu_\perp A_R A_T I}{2\pi} R^-(q_s) \frac{\partial}{\partial \rho} \frac{\partial}{\partial z_R} \frac{\exp(ik(\epsilon_\perp \mu_\perp)^{1/2}D)}{D}. \quad (39)$$

Reflection from a uniform half-space. A simple formula for the reflection coefficient $R^-$ is obtained if the medium is uniform below $z = z_L$. We use the subscript $_L$ for the electromagnetic parameters of the region $z < z_L$. For the solution $\psi^-$, we must have $\psi^- = A^-(e^{\beta z}+R^- e^{-\beta(z-2z_L)})$, for $z > z_L$, $\psi^- = e^{\beta_L z}$, for $z < z_L$. \quad (40)

At the boundary $z = z_L$, $\psi^-$ and $$\frac{d}{\mu_\perp dz} \psi^-$$

must be continuous, giving $$A^-(e^{\beta z_L}+R^- e^{-\beta(z_L-2z_L)}) = e^{\beta_L z_L} \quad (41)$$

$$A^- \frac{\beta}{\mu_\perp}(e^{\beta z_L} - R^- e^{-\beta(z_L-2z_L)}) = \left(\frac{\beta}{\mu_\perp}\right)_L e^{\beta_L z_L}$$

By solving these equations, we find $$R^-(q) = \frac{\beta(q) - \beta_L(q)}{\beta(q) + \beta_L(q)}, \quad (42)$$

where $$\beta(q) = \sqrt{q^2 - \epsilon_\perp \mu_\perp k^2}, \quad \beta_L(q) = \sqrt{q^2 - (\epsilon_\perp \mu_\perp)_L k^2}. \quad (43)$$

In Equation (39), $R^-$ must be evaluated at $q = q_s$ where $$q_s = k\sqrt{\epsilon_\perp \mu_\perp} \rho[\rho^2+(z_R-z_I)^2]^{-1/2}. \quad (44)$$

Equation (42) may be rewritten as $$R^-(q) = \frac{\beta^2(q) - \beta_L^2(q)}{[\beta(q) + \beta_L(q)]^2} = k^2 \mu_\perp \frac{(\epsilon_\perp)_L - \epsilon_\perp}{[\beta(q) + \beta_L(q)]^2}. \quad (45)$$

The leading term is proportional to $(\epsilon_\perp)_L - \epsilon_\perp$, as expected from the Born approximation, Equation (20).

Figure 4:
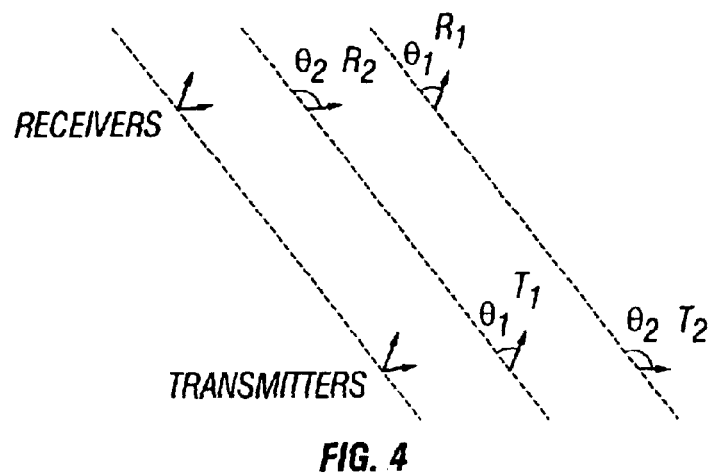
FIG. 4 is a schematic diagram of an alternative symmetrized directional induction measurement according to the invention.

Alternative implementation. Other antenna orientations may be used to obtain the same information. In FIG. 4, the antennas labeled 1 have a dipole moment tilted at an angle $\theta_1$ from the tool axis; the antennas labeled 2 have a dipole moment tilted at an angle $\theta_2$. Transmitter $T_1$ is activated, and the voltage measured on receiver $R_2$ is denoted $V_{21}$. Transmitter $T_2$ is then activated, and the voltage measured on receiver $R_1$ is denoted $V_{12}$. The difference $V_{12}-V_{21}$ gives the same information as the difference $V_{ZX}-V_{XZ}$ in FIG. 3.

The directions of the dipole moments of the coils, represented by unit vectors $u_1$, $u_2$, can be expressed, in the tool coordinates, as $u_1 = u_X \sin\theta_1 + u_Z \cos\theta_1$, $u_2 = u_X \sin\theta_2 + u_Z \cos\theta_2$. \quad (46)

Therefore $$V_{12} - V_{21} = Iu_1 \cdot \vec{Z}_{RT} \cdot u_2 - Iu_2 \cdot \vec{Z}_{RT} \cdot u_1 \quad (47)$$

$$= I(u_X\sin\theta_1 + u_Z\cos\theta_1) \cdot \vec{Z}_{RT} \cdot (u_X\sin\theta_2 + u_Z\cos\theta_2) -$$

$$I(u_X\sin\theta_2 + u_Z\cos\theta_2) \cdot \vec{Z}_{RT} \cdot (u_X\sin\theta_1 + u_Z\cos\theta_1)$$

$$= I(\sin\theta_2\cos\theta_1 - \sin\theta_1\cos\theta_2) \quad (48)$$

$$\left(u_Z \cdot \vec{Z}_{RT} \cdot u_X - u_X \cdot \vec{Z}_{RT} \cdot u_Z\right)$$

$$= \sin(\theta_2 - \theta_1)(V_{ZX} - V_{XZ}). \quad (49)$$

Other variations are readily apparent. In FIG. 4, the positions of transmitter $T_1$ and receiver $R_1$ may be interchanged. The positions of transmitter $T_2$ and receiver $R_2$ may also be interchanged.

Figure 5:
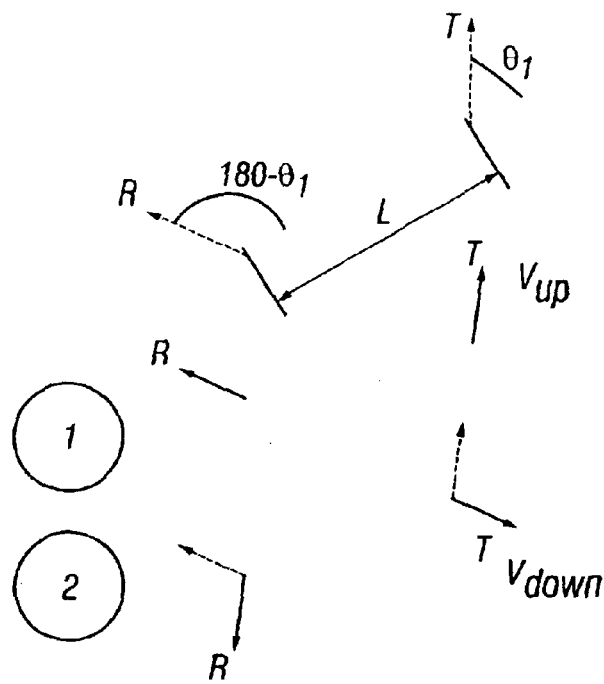
FIG. 5 is a schematic diagram of an alternative symmetrized directional induction measurement using a single transmitter-receiver pair according to the invention.

A simple extension of alternative measurement is for the antenna pair with $\theta_2 = 180° - \theta_1$, as illustrated in FIG. 5. It is a two-step measurement: data are acquired in a "primary" tool position, when the magnetic dipoles of the transmitter and receiver are directed towards the upper boundary, and in the position when the tool is rotated 180° about its axis from the primary position, when the dipoles are oriented towards the lower boundary. Basically, the measurement is taken when the field, i.e., the dipoles, are in the bedding plane. The dipole moment of transmitter T is tilted at an angle $\theta_1$ from the tool axis; and receiver R is tilted at angle $\theta_2$. First, transmitter T is turned on, and the voltage, $V_{up}$, on receiver R, is recorded. Second, tool is rotated for 180°, transmitter T is turned on, and the voltage, $V_{down}$, on receiver R, is recorded. The difference voltage, $V_{up} - V_{down}$, is used to obtain information about adjacent bed boundaries.

Propagation-type measurements. Cross-dipole coupling (XZ) is the principal measurement providing the directional up/down sensitivity. In the LWD environment, propagation style measurements are typically used, since they are relatively easy to build. With a propagation tool, XZ propagation measurements do not have directionality. Directional information is obtained with tilted antennas (at least one transmitter and/or receiver antenna tilted) and uses the difference between the tool response when it is looking up and the tool response when it is looking down. These "up-down" differential responses produce simple responses to bed boundaries. Both induction and propagation style directional measurements are sensitive to anisotropy at certain dip angles (e.g., $\alpha \neq 90°$ and $\alpha \neq 0°$). This sensitivity can easily be confused with the response of the tool to a nearby bed.

The present invention relates to directional measurements that are insensitive to anisotropy of the formation at a wide range of dip angles and over a wide frequency range. Some embodiments of the invention are based on anti-symmetrized antenna configurations or systems. "Anti-symmetry" or "anti-symmetric" as used herein refers to a configuration in which sets of transmitter-receiver arrangements are provided in opposite orientations along the tool axis, and these sets can be correlated with a standard symmetry operation (e.g., translation, mirror plane, inversion, and rotation) with respect to a point on the tool axis or a symmetry plane perpendicular to the tool axis.

According to embodiments of the invention, the logging tools may be adapted to measure the ratio or difference between the tool response when it is "looking" up and the tool response when it is "looking" down. These "up-down" differential responses produce simple responses to bed boundaries similar to the crossed-dipole measurements obtained with induction-type measurements.

Figure 6:
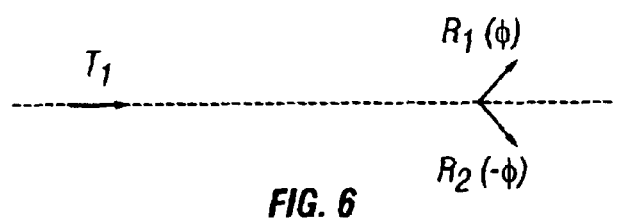
FIG. 6 is a schematic diagram of a basic antenna configuration for a propagation-type measurement according to the invention.

Implementing a directional measurement with up/down sensitivity using a propagation type tool relies on the use of tilted antennas, because in phase shift or attenuation, directionality information is lost if the transmitter and receiver antenna axes are mutually perpendicular and the transmitter or receiver axis is aligned with the tool axis. FIG. 6 shows an antenna configuration providing an essential building block for directional propagation-style measurements of the invention. In this configuration, a transmitter antenna T1 is spaced apart from two receivers, R1 and R2, along the tool axis. The receivers R1, R2 are tilted with respect to the tool axis. "Direction" of an antenna as used herein refers to the orientation of the magnetic dipole of an antenna when energized (i.e., when it functions as a transmitter), whether the antenna is actually used as a transmitter or a receiver.

The equivalent configuration to that shown in FIG. 6 is one with only one receiver, R1 for example (not shown). The equivalency is derived in the measurement. An "up-down" measurement is made. That is, a measurement is made when the tool is looking "up" and another is made when the tool is looking "down." The measurement is the ratio of the readings when the tool is looking up and when the tool is looking down. The "up-down" measurement is borehole compensated, i.e., the electronic noise is removed.

FIG. 7 shows several antenna configuration embodiments of the invention. Though all the configurations are useful for directional measurements, configuration c is particularly useful because, in the limit, if the tool spacing is much longer than the receiver spacing, this configuration approaches the basic building block of FIG. 6. In these directional measurements, responses are dependent on the tilt angles of the antennas. Such dependence may create unnecessary errors in the measurements. Therefore, an "up-down" measurement is made as described above. The "up" measurement is then subtracted from the "down" measurement, or vice versa, to remove the effects of the axial components. Such "up-down" measurements allow better manageability of the sensitivities with respect to tilt angles. The antennas may be tilted at various angles or transverse as shown in (FIGS. 7F–I). In the transverse case the effective area of the transverse antenna should be greater compared to the effective area of an axial antenna. It should be noted that for some antenna configurations, such as the one shown in FIG. 7F, the up-down measurement is not directional since resulting attenuation is 0, and phase shift is 0 or 180°.

Figure 9A:
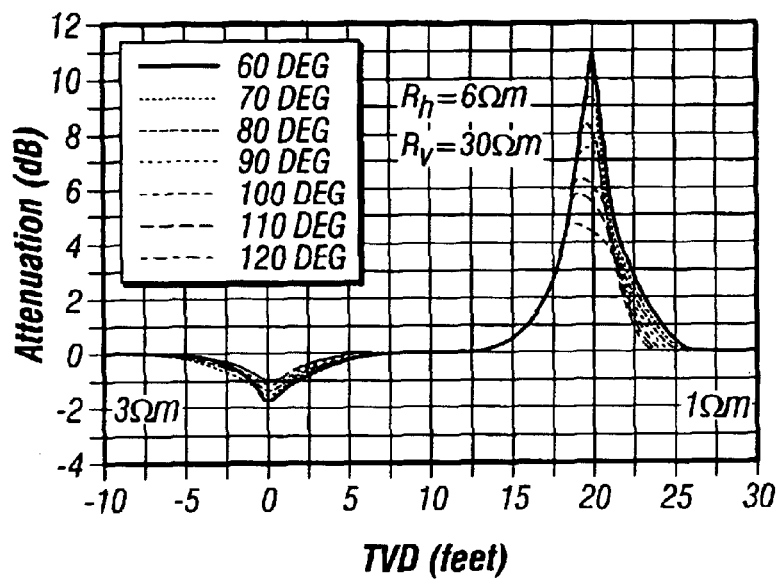
FIG. 9 is a graph of responses of directional measurements according to the configurations in FIG. 8 as a function of dip angles in a formation with two boundaries and three regions, one of which is anisotropic.
Figure 9B:
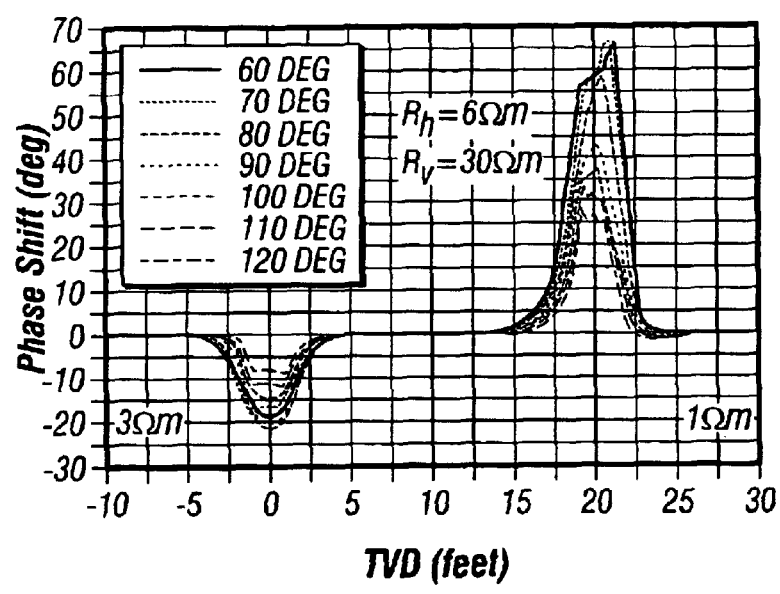
Figure 10A:
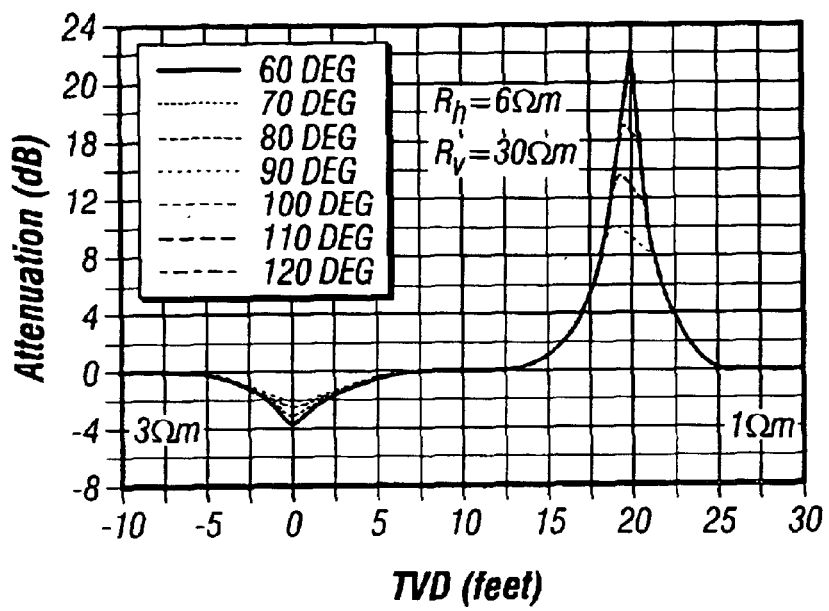
FIG. 10 is a graph of "up-down" responses of directional measurements according to the configurations in FIG. 8 as a function of dip angles in a formation with two boundaries and three regions, one of which is anisotropic.
Figure 10B:
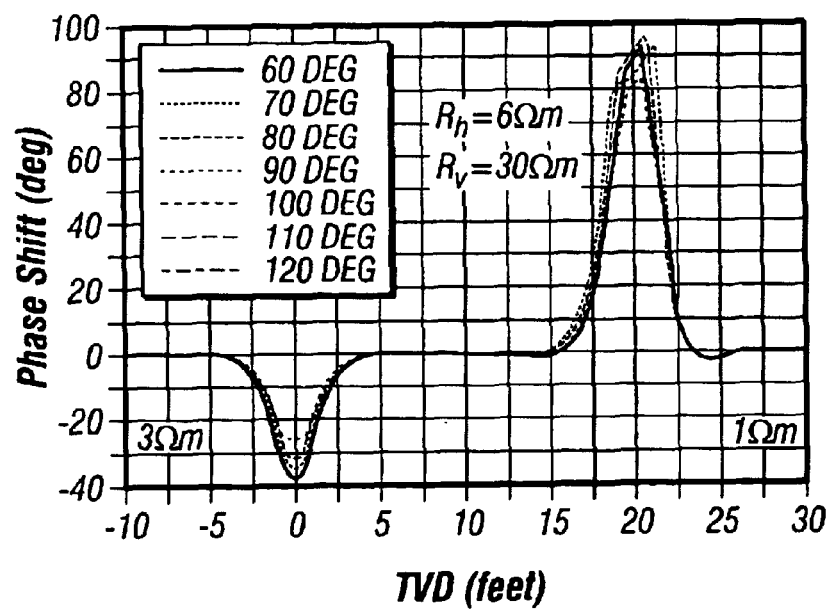
Figure 11A:
FIGS. 11A–11D are schematic diagrams of variations of the antenna configurations shown in FIGS. 8A and 8B.
Figure 11B:
Figure 11C:
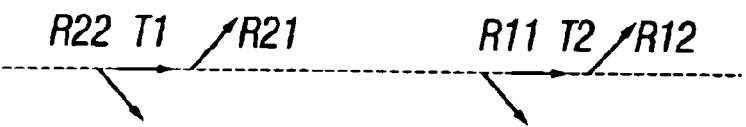
Figure 11D:

Embodiments of the invention use an anti-symmetric transmitter-receiver arrangement to remove the dip dependence. Two tool configurations insensitive to anisotropy at any dip are shown in FIG. 8. These configurations correspond to FIG. 7B and 7C. Similar layouts can be derived for all the other configurations of FIG. 7. In each case, transmitter T1 is energized and the phase shift and attenuation from the receivers near T2 is measured. Then transmitter T2 is energized and the phase shift and attenuation from the receivers near T1 is measured. The tool reading is the difference between these two measurements. Since the individual measurements are identical in a homogeneous medium at any angle and with any anisotropy, the tool readings is zero in a homogenous medium at any dip. The measurement responses in a three-layer formation are shown in FIG. 9. The tool reading is zero far from the boundary, and there is little sensitivity to anisotropy close to the boundary. Separation in responses comes from the fact that propagation responses are not symmetric if the transmitter and receiver location are interchanged. Making an up-down measurement contains only the directional information, even close to the boundary, as shown in FIG. 10. It should be observed that attenuation responses are practically overlapping for different dip if all antennas are in the same medium, similarly to ideal XZ-ZX induction measurement (described above). The phase shift measurements are also overlapping, although responses are double-valued in the conductive bed (1 S/m).

Knowing the process to derive these measurements, the equivalent configurations producing similar results are shown in FIG. 11. Using the configuration of FIG. 8A as an example, the receivers closer to the corresponding transmitter in the transmitter-receiver pair (e.g., R11 is closer to T1 than R12 is, and R21 is closer to T2 than R22 is) would be referred to as the "near" receivers (i.e., R11 and R21), whereas the others (i.e., R12 and R22) as the "far" receivers. There are two options: (1) using the depth shifting (11A and 11B); and (2) using tool layouts (for example, 11C and 11D)

that require addition, instead of subtraction of two basic propagation measurements. It should be noted that configurations from FIGS. 11C–D do not read zero in homogenous medium, as configurations from FIG. 8 do.

If we look at the phase shift and attenuation from the configuration in FIG. 8, we can show that the behavior of this propagation tool to a bed boundary is very similar to the behavior of the cross-term XZ. We start with the observation that $$\ln\left(\frac{V^{near}}{V^{far}}\right) = 8.68 \cdot Attn - \frac{180}{\pi} i \cdot PhaseShift, \quad (50)$$

where Attenuation is measured in dB and Phase Shift is measured in degrees.

For a tool at an angle of 90° to the bedding (horizontal tool), the voltage ratio measured when T1 is energized is:

$$\frac{V_{ZZ}^{near} + V_{XZ}^{near}}{V_{ZZ}^{far} - V_{XZ}^{far}}, \quad (51)$$

while the voltage ratio measured when T2 is energized is:

$$\frac{V_{ZZ}^{near} + V_{ZX}^{near}}{V_{ZZ}^{far} - V_{ZX}^{far}}. \quad (52)$$

Taking the difference of the log ratios gives:

$$\ln\left(\frac{V_{ZZ}^{near} + V_{XZ}^{near}}{V_{ZZ}^{far} - V_{XZ}^{far}}\right) - \ln\left(\frac{V_{ZZ}^{near} + V_{ZX}^{near}}{V_{ZZ}^{far} - V_{ZX}^{far}}\right) =$$

$$\ln\left(\frac{V_{ZZ}^{near} + V_{XZ}^{near}}{V_{ZZ}^{near} + V_{ZX}^{near}}\right) + \ln\left(\frac{V_{ZZ}^{far} - V_{XZ}^{far}}{V_{ZZ}^{far} - V_{ZX}^{far}}\right)$$

Now the directionality of the measurement is in the cross terms and $V_{XZ} = -V_{ZX}$. If we are not too close to the boundaries then the cross terms will be much less than the direct coupling and we can approximate:

$$\ln\left(\frac{V_{ZZ}^{near} + V_{XZ}^{near}}{V_{ZZ}^{near} + V_{ZX}^{near}}\right) + \ln\left(\frac{V_{ZZ}^{far} - V_{XZ}^{far}}{V_{ZZ}^{far} - V_{ZX}^{far}}\right) \cong \frac{2V_{XZ}}{V_{ZZ}} + \frac{2V_{XZ}}{V_{ZZ}}. \quad (53)$$

Thus the measurements of this propagation tool will approximate the measurements made by an ideal directional induction tool.

The general rule for directional propagation measurement is: Let $M(\theta_T, \theta_{R1}, \theta_{R2})$ be a propagation measurement with tilted antenna, where $\theta_T$ is the transmitter tilt and $\theta_{R1}$ and $\theta_{R2}$ are tilts of two receiver antennas. If $M^*(\theta_T, \theta_{R1}, \theta_{R2})$ is the measurement with transmitter and receivers switched, (i.e., $M^*$ is the mirror image of M with respect to the central plane perpendicular to the tool axis, with all antenna orientations preserved) then $$(M(\theta_T, \theta_{R1}, \theta_{R2}) - M^*(\theta_T, \theta_{R1}, \theta_{R2}))_{UP} - (M(\theta_T, \theta_{R1}, \theta_{R2}) - M^*(\theta_T, \theta_{R1}, \theta_{R2}))_{DOWN} \quad (54)$$

is not sensitive to anisotropy at any dip and is only sensitive to boundaries (subscripts UP and DOWN denote measurements when the tool is oriented up or down, with all dipoles in the plane perpendicular to the bedding.

Figure 12:
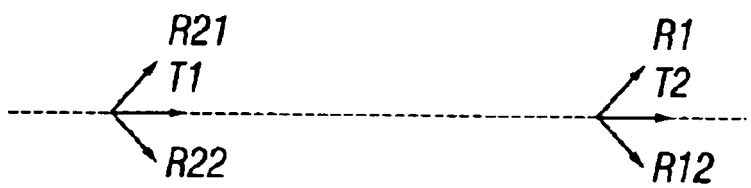
FIG. 12 is a schematic diagram of another variant of a directional antenna configuration according to the invention.

This concept is useful when the base measurement $M(\theta_T, \theta_{R1}, \theta_{R2})$ performs well in horizontal wells. The concept also includes tools with all antennas tilted, including transverse antennas. FIG. 12 shows another embodiment of the invention. This configuration also provides a basic building block for directional propagation measurements insensitive to anisotropy at any dip.

Figure 13A:
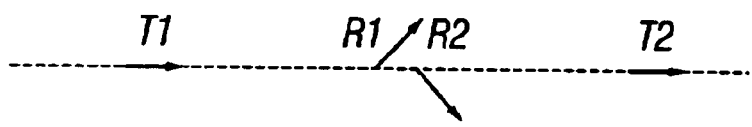
FIGS. 13A and 13B are schematic diagrams of two borehole compensated variants of directional antenna configurations according to the invention.
Figure 13B:
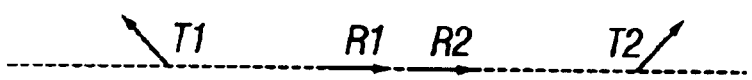

An alternative to the two-receiver embodiment of the invention relies on depth shifting, which complicates its use for geosteering. FIG. 13 shows two embodiments of the invention presenting possible options. These two-antenna systems do not read zero in the homogenous anisotropic medium at any dip, similarly to tools from FIG. 11. One advantage of these configurations is that they are borehole compensated, while other measurements rely on "up-down" to remove the electronic drift.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining a parameter of a subsurface formation traversed by a borehole, comprising:

a) disposing a logging instrument having a longitudinal axis and equipped with multiple antennas within the borehole, a first pair of transmitter-receiver antennas with a first antenna having its axis oriented in a first direction at angle $\theta_1$ with respect to the instrument axis and a second antenna having its axis oriented in a second direction at angle $\theta_2$ with respect to the instrument axis, a second pair of transmitter-receiver antennas with a first antenna, located near the second antenna of the first pair, having its axis oriented in said first direction at said angle $\theta_1$ with respect to the instrument axis and a second antenna, located near the first antenna of the first pair, having its axis oriented in said second direction at said angle $\theta_2$ with respect to the instrument axis, wherein said first and second directions are different;

b) transmitting electromagnetic energy from the transmitter antenna of said first transmitter-receiver pair;

c) measuring a signal associated with the transmitted energy at the receiver antenna of said first transmitter-receiver pair;

d) transmitting electromagnetic energy from the transmitter antenna of said second transmitter-receiver pair;

e) measuring a signal associated with the transmitted energy at the receiver antenna of said second transmitter-receiver pair; and f) calculating a difference between the measured signals of steps (c) and (e) to determine the formation parameter.

2. The method of claim 1, wherein the method is performed during the drilling of said borehole.

3. The method of claim 2, wherein the formation parameter is one of resistivity, a distance to a boundary, or an orientation of a boundary relative to said instrument.

4. The method of claim 3, wherein the measured signals include one of a voltage signal, a logarithm of a voltage amplitude, or a phase shift.

5. The method of claim 4, wherein angle $\theta_1$ is 0 degrees angle $\theta_2$ is 90 degrees.

6. The method of claim 4, wherein angles $\theta_1$ and $\theta_2$ do not include 0 or 90 degrees.

7. The method of claim 4, further comprising:
g) rotating the instrument by 180 degrees about its longitudinal axis; and
h) repeating steps (b) thru (f).

8. A method for determining a parameter of a subsurface formation traversed by a borehole, comprising:
   a) disposing a logging instrument having a longitudinal axis and equipped with multiple antennas within the borehole, a transmitter antenna having its magnetic moment oriented in a first direction at angle $\theta_1$ with respect to the instrument axis, a receiver antenna having its axis oriented in a second direction at angle $180-\theta_1$ with respect to the instrument axis, said first and second directions being toward opposite ends of said instrument;
   b) transmitting electromagnetic energy from the transmitter antenna;
   c) measuring a signal associated with the transmitted energy at the receiver antenna;
   d) rotating the instrument by 180 degrees about its longitudinal axis and measuring a signal associated with the transmitted energy at the receiver antenna; and
   e) calculating a difference between the measured signals of steps (c) and (d) to determine the formation parameter.

9. The method of claim 8, wherein the method is performed during the drilling of said borehole.

10. The method of claim 9, wherein the formation parameter is one of resistivity, a distance to a boundary, or an orientation of a boundary relative to said instrument.

11. The method of claim 10, wherein angle $\theta_1$ is between 0 and 90 degrees.

12. The method of claim 11, wherein the measured signals include one of a voltage signal, a logarithm of voltage amplitude, or a phase shift.

13. A method for determining a parameter of a subsurface formation traversed by a borehole, comprising:
   a) disposing a logging instrument having a longitudinal axis within the borehole, said instrument equipped with:
      i. a first antenna system including a receiver antenna having its axis oriented in a first direction at angle $\theta_1$ with respect to the instrument axis, a second receiver antenna having its axis oriented in a second direction at angle $\theta_2$ with respect to the instrument axis, and a first transmitter antenna located at the mid-point between said first and second receiver antennas and having its magnetic moment oriented in a third direction at angle $\theta_3$ with respect to the instrument axis; and
      ii. a second antenna system forming the mirror image of said first antenna system with respect to the central plane perpendicular to the instrument axis such that a third receiver antenna has its axis oriented in said first direction at said angle $\theta_1$ with respect to the instrument axis, a fourth receiver antenna has its axis oriented in said second direction at said angle $\theta_2$ with respect to the instrument axis and is separated from the third receiver antenna by the same distance as the first receiver antenna is separated from the second receiver antenna, and a second transmitter antenna is located at the mid-point between said third and fourth receiver antennas with its magnetic moment oriented in said third direction at said angle $\theta_3$ with respect to the instrument axis;
   b) transmitting electromagnetic energy from the first transmitter antenna;
   c) measuring a signal associated with the transmitted energy at the third and fourth receiver antennas;
   d) calculating signal attenuation in dB and relative phase shift using the measured signal of step (c);
   e) transmitting electromagnetic energy from the second transmitter antenna;
   f) measuring a signal associated with the transmitted energy at the first and second receiver antennas;
   g) calculating signal attenuation in dB and relative phase shift using the measured signal of step (f); and
   h) calculating a difference using values obtained from steps (d) and (g) to determine the formation parameter.

14. The method of claim 13, wherein the method is performed during the drilling of said borehole.

15. The method of claim 14, wherein the formation parameter is one of resistivity, a distance to a boundary, or an orientation of a boundary relative to said instrument.

16. The method of claim 14, wherein angles $\theta_1$, $\theta_2$ and $\theta_3$ are between 0 and 90 degrees with respect to the instrument axis.

17. The method of claim 14, wherein angles $\theta_1$ and $\theta_2$ are equal.

18. The method of claim 14, wherein angle $\theta_3$ is 0 and angles $\theta_1$ and $\theta_2$ are between 0 and 90 degrees with respect to the instrument axis.

19. The method of claim 14, wherein either angle $\theta_1$, $\theta_2$, or $\theta_3$ is 0 with respect to the instrument axis.

20. The method of claim 14, further comprising:
   i) rotating the instrument by 180 degrees about its longitudinal axis;
   j) repeating steps (b) thin (h); and
   k) calculating a difference between signals obtained from steps (h) and (j).

21. A method for determining a parameter of a subsurface formation traversed by a borehole, comprising:
   a) disposing a logging instrument having a longitudinal axis within the borehole, said instrument equipped with:
      i. a first antenna system including a receiver antenna having its axis oriented in a first direction at angle $\theta_1$ with respect to the instrument axis, a second receiver antenna having its axis oriented in a second direction at angle $\theta_2$ with respect to the instrument axis, and a first transmitter antenna located at the mid-point between said first and second receiver antennas and having its magnetic moment oriented in a third direction at angle $\theta_3$ with respect to the instrument axis; and
      ii. a second antenna system including a third receiver antenna having its axis oriented in said first direction at angle $-\theta_1$ with respect to the instrument axis, a fourth receiver antenna having its axis oriented in said second direction at angle $-\theta_2$ with respect to the instrument axis and separated from the third receiver antenna by the same distance as the first receiver antenna is separated from the second receiver antenna, and a second transmitter antenna located at the mid-point between said third and fourth receiver antennas with its magnetic moment oriented in a third direction at angle $-\theta_3$ with respect to the instrument axis;
   b) transmitting electromagnetic energy from the first transmitter antenna;
   c) measuring a signal associated with the transmitted energy at the third and fourth receiver antennas;

d) calculating signal attenuation in dB and relative phase shift using the measured signal of step (c);

e) transmitting electromagnetic energy from the second transmitter antenna;

f) measuring a signal associated with the transmitted energy at the first and second receiver antennas;

g) calculating signal attenuation in dB and relative phase shift using the measured signal of step (f); and h) calculating a sum using values obtained from steps (d) and (g) to determine the formation parameter.

22. The method of claim 21, wherein the method is performed during the drilling of said borehole.

23. The method of claim 22, wherein the formation parameter is one of resistivity, a distance to a boundary, or an orientation of a boundary relative to the instrument.

24. The method of claim 22, wherein angles $\theta_1$, $\theta_2$ and $\theta_3$ are between 0 and 90 degrees with respect to the instrument axis.

25. The method of claim 24, wherein angles $\theta_1$ and $\theta_2$ are equal.

26. The method of claim 22, wherein angle $\theta_3$ is 0 and angles $\theta_1$ and $\theta_2$ are between 0 and 90 degrees with respect to the instrument axis.

27. The method of claim 22, wherein either angle $\theta_1$, $\theta_2$, or $\theta_3$ is 0.

28. The method of claim 22, further comprising:
  i) rotating the instrument by 180 degrees about its longitudinal axis;
  j) repeating steps (b) thru (h); and
  k) calculating a difference between signals obtained from steps (h) and (j).

29. A method for determining a parameter of a subsurface formation traversed by a borehole, comprising:
  a) disposing a logging instrument having a longitudinal axis within the borehole, said instrument equipped with:
    i. a first antenna system including a receiver antenna having its axis oriented in a first direction at angle $\theta_1$ with respect to the instrument axis, a second receiver antenna with its axis oriented in a second direction at angle $\theta_2$ with respect to the instrument axis, and a first transmitter antenna having its magnetic moment oriented in a third direction at angle $\theta_3$ with respect to the instrument axis; and
    ii. a second antenna system forming the mirror image of said first antenna system with respect to the central plane perpendicular to the instrument axis such that a third receiver antenna has its axis oriented in said first direction at said angle $\theta_1$ with respect to the instrument axis, a fourth receiver antenna has its axis oriented in said second direction at said angle $\theta_2$ with respect to the instrument axis, and a second transmitter antenna has its magnetic moment oriented in said third direction at said angle $\theta_3$ with respect to the instrument axis wherein the mid-point between said first and second transmitter antennas coincides with the mid-point between said first and third receiver antennas and the mid-point between said second and fourth receiver antennas;
  b) transmitting electromagnetic energy from the first transmitter antenna;
  c) measuring a signal associated with the transmitted energy at the third and fourth receiver antennas;
  d) calculating signal attenuation in dB and relative phase shift using the signal measured in step (c);
  e) transmitting electromagnetic energy from the second transmitter antenna;
  f) measuring a signal associated with the transmitted energy at the first and second receiver antennas;
  g) calculating signal attenuation in dB and relative phase shift using the signal measured in step (f); and
  h) calculating a difference using values obtained from steps (d) and (g) to determine the formation parameter.

30. The method of claim 29, wherein the method is performed during the drilling of said borehole.

31. The method of claim 30, wherein angles $\theta_1$, $\theta_2$ and $\theta_3$ are between 0 and 90 degrees with respect to the instrument axis.

32. The method of claim 30, wherein angles $\theta_1$ and $\theta_2$ are equal.

33. The method of claim 30, wherein angle $\theta_3$ is 0 and angles $\theta_1$ and $\theta_2$ are between 0 and 90 degrees with respect to the instrument axis.

34. The method of claim 30, wherein either angle $\theta_1$, $\theta_2$, or $\theta_3$ is 0.

35. The method of claim 30, further comprising:
  i) rotating the instrument by 180 degrees about its longitudinal axis;
  j) repeating steps b) thru (h); and
  k) calculating a difference between signals obtained from steps (h) and (j).

36. The method of claim 30, wherein step (e) includes displacing the instrument along the borehole by a distance substantially equivalent to the spacing between said first and second transmitter antennas.

37. A method for determining a parameter of a subsurface formation traversed by a borehole, comprising:
  a) disposing a logging instrument having a longitudinal axis within the borehole, said instrument including a pair of receiver antennas near one another with their individual axis at an angle $\theta_1$ with respect to the instrument axis, a first transmitter antenna located at one side of the receiver antenna pair with its magnetic moment at an angle $\theta_2$ with respect to the instrument axis, a second transmitter antenna located at the other side of the receiver antenna pair with its magnetic moment at said angle $\theta_2$ with respect to the instrument axis, wherein the mid-point between said receiver antennas coincides with the mid-point between said transmitter antennas;
  b) transmitting electromagnetic energy from the first transmitter antenna;
  c) measuring a signal associated with the transmitted energy at each antenna of said receiver antenna pair;
  d) calculating signal attenuation in dB and relative phase shift from the measured signal of step (c);
  e) transmitting electromagnetic energy from the second transmitter antenna;
  f) measuring a signal associated with the transmitted energy at each antenna of said receiver antenna pair;
  g) calculating signal attenuation in dB and relative phase shift from the measured signal of step (f); and
  h) calculating a difference using values obtained from steps (d) and (g) to determine the formation parameter.

38. The method of claim 37, wherein the method is performed during the drilling of said borehole.

39. The method of claim 38, wherein angle $\theta_1$ is 0 and angle $\theta_2$ is between 0 and 90 degrees with respect to the instrument axis.

40. The method of claim 38, wherein angle $\theta_2$ is 0 and angle $\theta_1$ is between 0 and 90 degrees with respect to the instrument axis.

41. The method of claim 38, further comprising:
  i) rotating the instrument by 180 degrees about its longitudinal axis;
  j) repeating steps (b) thru (h); and
  k) calculating a difference between signals obtained from steps (h) and (j).

42. The method of claim 38, wherein step (e) includes displacing the instrument along the borehole by a distance substantially equivalent to the spacing from the mid-point between said receiver antennas and either of said transmitter antennas.

43. A method for determining a parameter of a subsurface formation traversed by a borehole, comprising:
  a) disposing a logging instrument having a longitudinal axis within the borehole, said instrument including a first receiver antenna with its axis at an angle $\theta_1$ with respect to the instrument axis; a second receiver antenna with its axis at an angle $-\theta_1$ with respect to the instrument axis, a first transmitter antenna located at one side of the receiver antenna pair with its magnetic moment at an angle $\theta_2$ with respect to the instrument axis, a second transmitter antenna located at the other side of the receiver antenna pair with its magnetic moment at an angle $-\theta_2$ with respect to the instrument axis, wherein the mid-point between said receiver antennas coincides with the mid-point between said transmitter antennas;
  b) transmitting electromagnetic energy from the first transmitter antenna;
  c) measuring a signal associated with the transmitted energy at each antenna of said receiver antenna pair;
  d) calculating signal attenuation in dB and relative phase shift from the measured signal of step (c);
  e) transmitting electromagnetic energy from the second transmitter antenna;
  f) measuring a signal associated with the transmitted energy at each antenna of said receiver antenna pair;
  g) calculating signal attenuation in dB and relative phase shift from the measured signal of step (f); and
  h) calculating a sum using values obtained from steps (d) and (g) to determine the formation parameter.

44. The method of claim 43, wherein the method is performed during the drilling of said borehole.

45. The method of claim 44, wherein angle $\theta_1$ is 0 and angle $\theta_2$ is between 0 and 90 degrees with respect to the instrument axis.

46. The method of claim 44, wherein angle $\theta_2$ is 0 and angle $\theta_1$ is between 0 and 90 degrees with respect to the instrument axis.

47. The method of claim 44, further comprising:
  i) rotating the instrument by 180 degrees about its longitudinal axis;
  j) repeating steps (b) thru (h); and
  k) calculating a difference between signals obtained from steps (h) and (j).

48. The method of claim 44, wherein step (e) includes displacing the instrument along the borehole by a distance substantially equivalent to the spacing from the mid-point between said receiver antennas and either of said transmitter antennas.

49. A method for determining a parameter of a subsurface formation traversed by a borehole, comprising:
  a) disposing a logging instrument having a longitudinal axis within the borehole, said instrument including first and second transmitter antennas each with its magnetic moment at an angle $\theta_1$ with respect to the instrument axis, and a receiver antenna located between said transmitter antennas with its axis at an angle $\theta_2$ with respect to the instrument axis;
  b) transmitting electromagnetic energy from the first transmitter antenna;
  c) measuring a signal associated with the transmitted energy at the receiver antenna;
  d) displacing the instrument along the borehole by a distance substantially equivalent to the spacing from said receiver antenna to either of said transmitter antennas;
  e) transmitting electromagnetic energy from the second transmitter antenna;
  f) measuring a signal associated with the transmitted energy of step (e) at said receiver antenna; and
  g) calculating a difference using values obtained from steps (c) and (f) to determine the formation parameter.

50. The method of claim 49, wherein angles $\theta_1$ and $\theta_2$ are between 0 and 90 degrees with respect to the instrument axis.

51. The method of claim 49, wherein angle $\theta_1$ is 0 and angle $\theta_2$ is between 0 and 90 degrees with respect to the instrument axis.

52. The method of claim 49, wherein angle $\theta_2$ is 0 and angle $\theta_1$ is between 0 and 90 degrees with respect to the instrument axis.

53. A method for determining a parameter of a subsurface formation traversed by a borehole, comprising:
  a) disposing a logging instrument having a longitudinal axis within the borehole, said instrument including first and second transmitter antennas each with its magnetic moment at an angle $\theta_1$ with respect to the instrument axis, and a receiver antenna located at the mid-point between said transmitter antennas with its axis at an angle $\theta_2$ with respect to the instrument axis;
  b) transmitting electromagnetic energy from the first transmitter antenna;
  c) measuring a signal associated with the transmitted energy at the receiver antenna;
  d) rotating the instrument by 180 degrees about its longitudinal axis and measuring a signal associated with the transmitted energy at the receiver antenna;
  e) calculating signal attenuation in dB and relative phase shift from the measured signals of steps (c) and (d);
  f) displacing the instrument along the borehole by a distance substantially equivalent to the spacing from said receiver antenna to either of said transmitter antennas;
  g) transmitting electromagnetic energy from the second transmitter antenna;
  h) measuring a signal associated with the transmitted energy of step (g) at said receiver antenna;
  i) rotating the instrument by 180 degrees about its longitudinal axis and measuring a signal associated with the transmitted energy at the receiver antenna;
  j) calculating signal attenuation in dB and relative phase shift from the measured signals of steps (h) and (i); and
  k) calculating a difference using values obtained from steps (e) and (j) to determine the formation parameter.

54. The method of claim 53, wherein angles $\theta_1$ and $\theta_2$ are between 0 and 90 degrees with respect to the instrument axis.

55. The method of claim 53, wherein angle $\theta_1$ is 0 and angle $\theta_2$ is between 0 and 90 degrees with respect to the instrument axis.

56. The method of claim 53, wherein angle $\theta_2$ is 0 and angle $\theta_1$ is between 0 and 90 degrees with respect to the instrument axis.

57. A logging tool adapted for deployment within a subsurface formation traversed by a borehole, comprising:
an elongated support having a longitudinal axis;
a first antenna system disposed on said support, including a receiver antenna having its axis oriented in a first direction at angle $\theta_1$ with respect to the support axis, a second receiver antenna having its axis oriented in a second direction at angle $\theta_2$ with respect to the support axis, and a first transmitter antenna located at the mid-point between said first and second receiver antennas and having its magnetic moment oriented in a third direction at angle $\theta_3$ with respect to the support axis;
a second antenna system disposed on said support, said system forming the mirror image of said first antenna system with respect to the central plane perpendicular to the support axis such that a third receiver antenna has its axis oriented in said first direction at said angle $\theta_1$ with respect to the support axis, a fourth receiver antenna has its axis oriented in said second direction at said angle $\theta_2$ with respect to the support axis and is separated from the third receiver antenna by the same distance as the first receiver antenna is separated from the second receiver antenna, and a second transmitter antenna is located at the mid-point between said third and fourth receiver antennas with its magnetic moment oriented in said third direction at said angle $\theta_3$ with respect to the support axis; and said antennas of said systems respectively adapted to transmit or receive electromagnetic energy.

58. The logging tool of claim 57, wherein angles $\theta_1$, $\theta_2$ and $\theta_3$ are between 0 and 90 degrees with respect to the support axis.

59. The logging tool of claim 57, wherein angles $\theta_1$ and $\theta_2$ are equal.

60. The logging tool of claim 57, wherein angle $\theta_3$ is 0 and angles $\theta_1$ and $\theta_2$ are between 0 and 90 degrees with respect to the support axis.

61. The logging tool of claim 57, wherein either angle $\theta_1$, $\theta_2$, or $\theta_3$ is 0 with respect to the support axis.

62. A logging tool adapted for deployment within a subsurface formation traversed by a borehole, comprising:
an elongated support having a longitudinal axis;
a first antenna system disposed on said support, including a receiver antenna having its axis oriented in a first direction at angle $\theta_1$ with respect to the support axis, a second receiver antenna having its axis oriented in a second direction at angle $\theta_2$ with respect to the support axis, and a first transmitter antenna located at the mid-point between said first and second receiver antennas and having its magnetic moment oriented in a third direction at angle $\theta_3$ with respect to the support axis;
a second antenna system disposed on said support, including a third receiver antenna having its axis oriented in said first direction at angle $-\theta_1$ with respect to the support axis, a fourth receiver antenna having its axis oriented in said second direction at angle $-\theta_2$ with respect to the support axis and separated from the third receiver antenna by the same distance as the first receiver antenna is separated from the second receiver antenna, and a second transmitter antenna located at the mid-point between said third and fourth receiver antennas with its magnetic moment oriented in a third direction at angle $-\theta_3$ with respect to the support axis; and
said antennas of said systems respectively adapted to transmit or receive electromagnetic energy.

63. The logging tool of claim 62, wherein angles $\theta_1$, $\theta_2$ and $\theta_3$ are between 0 and 90 degrees with respect to the support axis.

64. The togging tool of claim 62, wherein angles $\theta_1$ and $\theta_2$ are equal.

65. The logging tool of claim 62, wherein angle $\theta_3$ is 0 and angles $\theta_1$ and $\theta_2$ are between 0 and 90 degrees with respect to the support axis.

66. The logging tool of claim 62, wherein either angle $\theta_1$, $\theta_2$, or $\theta_3$ is 0.

67. A logging tool adapted for deployment within a subsurface formation traversed by a borehole, comprising:
an elongated support having a longitudinal axis;
a first antenna system disposed on said support, including a receiver antenna having its axis oriented in a first direction at angle $\theta_1$ with respect to the support axis, a second receiver antenna with its axis oriented in a second direction at angle $\theta_2$ with respect to the support axis, and a first transmitter antenna having its magnetic moment oriented in a third direction at angle $\theta_3$ with respect to the support axis;
a second antenna system disposed on said support forming the mirror image of said first antenna system with respect to the central plane perpendicular to the support axis such that a third receiver antenna has its axis oriented in said first direction at said angle $\theta_1$ with respect to the support axis, a fourth receiver antenna has axis oriented in said second direction at said angle $\theta_2$ with respect to the support axis, and a second transmitter antenna has its magnetic moment oriented in said third direction at said angle $\theta_3$ with respect to the support axis wherein the mid-point between said first and second transmitter antennas coincides with the mid-point between said first and third receiver antennas and the mid-point between said second and fourth receiver antennas; and
said antennas of said systems respectively adapted to transmit or receive electromagnetic energy.

68. The logging tool of claim 67, wherein angles $\theta_1$, $\theta_2$ and $\theta_3$ are between 0 and 90 degrees with respect to the support axis.

69. The logging tool of claim 67, wherein angles $\theta_1$ and $\theta_2$ are equal.

70. The logging tool of claim 67, wherein angle $\theta_3$ is 0 and angles $\theta_1$ and $\theta_2$ are between 0 and 90 degrees with respect to the support axis.

71. The logging tool of claim 67, wherein either angle $\theta_1$, $\theta_2$, or $\theta_3$ is 0.

72. A logging tool adapted for deployment within a subsurface formation traversed by a borehole, comprising:
an elongated support having a longitudinal axis;
a pair of receiver antennas disposed on said support near one another with their individual axis at an angle $\theta_1$ with respect to the support axis;
a first transmitter antenna located at one side of the receiver antenna pair with its magnetic moment at an angle $\theta_2$ with respect to the support axis;
a second transmitter antenna located at the other side of the receiver antenna pair with its magnetic moment at said angle $\theta_2$ with respect to the support axis;

wherein the mid-point between said receiver antennas coincides with the mid-point between said transmitter antennas;

wherein angle $\theta_1$ is 0 and angle $\theta_2$ is between 0 and 90 degrees with respect to the support axis; and said antennas respectively adapted to transmit or receive electromagnetic energy.

73. A logging tool adapted for deployment within a subsurface formation traversed by a borehole, comprising:

an elongated support having a longitudinal axis;

a pair of receiver antennas disposed on said support near one another with their individual axis at an angle $\theta_1$ with respect to the support axis;

a first transmitter antenna located at one side of the receiver antenna pair with its magnetic moment at an angle $\theta_2$ with respect to the support axis;

a second transmitter antenna located at the other side of the receiver antenna pair with its magnetic moment at said angle $\theta_2$ with respect to the support axis;

wherein the mid-point between said receiver antennas coincides with the mid-point between said transmitter antennas;

wherein angle $\theta_2$ is 0 and angle $\theta_1$ is between 0 and 90 degrees with respect to the support axis; and said antennas respectively adapted to transmit or receive electromagnetic energy.

74. A logging tool adapted for deployment within a subsurface formation traversed by a borehole, comprising:

an elongated support having a longitudinal axis;

a first receiver antenna disposed on said support with its axis at an angle $\theta_1$ with respect to the support axis;

a second receiver antenna with its axis at an angle $-\theta_1$ with respect to the support axis;

a first transmitter antenna located at one side of the receiver antenna pair with its magnetic moment at an angle $\theta_2$ with respect to the support axis;

a second transmitter antenna located at the other side of the receiver antenna pair with its magnetic moment at an angle $-\theta_2$ with respect to the support axis;

wherein the mid-point between said receiver antennas coincides with the mid-point between said transmitter antennas;

wherein angle $\theta_2$ is 0 and angle $\theta_1$ is between 0 and 90 degrees with respect to the support axis; and said antennas respectively adapted to transmit or receive electromagnetic energy.

75. A logging tool adapted for deployment within a subsurface formation traversed by a borehole, comprising:

an elongated support having a longitudinal axis;

a first receiver antenna disposed on said support with its axis at an angle $\theta_1$ with respect to the support axis;

a second receiver antenna with its axis at an angle $-\theta_1$ with respect to the support axis;

a first transmitter antenna located at one side of the receiver antenna pair with its magnetic moment at an angle $\theta_2$ with respect to the support axis;

a second transmitter antenna located at the other side of the receiver antenna pair with its magnetic moment at an angle $-\theta_2$ with respect to the support axis;

wherein the mid-point between said receiver antennas coincides with the mid-point between said transmitter antennas;

wherein angle $\theta_1$ is 0 and angle $\theta_2$ is between 0 and 90 degrees with respect to the support axis; and said antennas respectively adapted to transmit or receive electromagnetic energy.

* * * * *